W. V. TURNER.
FLUID PRESSURE BRAKE.
APPLICATION FILED NOV. 22, 1904.
1,031,210.
Patented July 2, 1912.
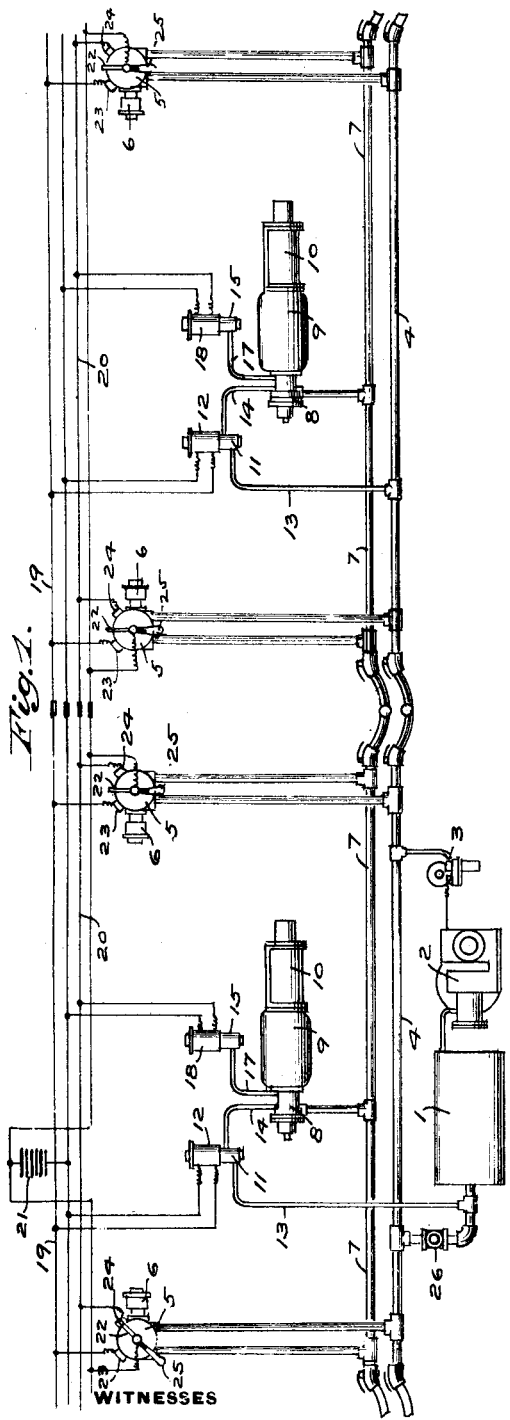
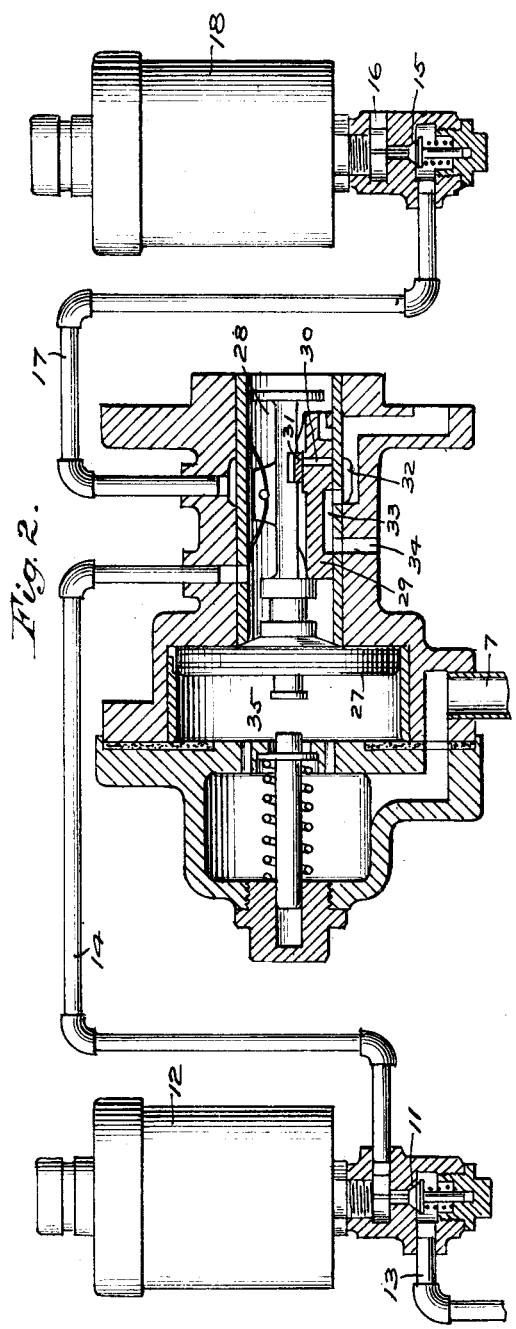
WITNESSES
James B. MacDonald
J. S. Custer
INVENTOR
Walter V. Turner
by E. Wright
Att'y.

UNITED STATES PATENT OFFICE.

WALTER V. TURNER, OF WILKINSBURG, PENNSYLVANIA, ASSIGNOR TO THE WESTINGHOUSE AIR BRAKE COMPANY, OF PITTSBURGH, PENNSYLVANIA, A CORPORATION OF PENNSYLVANIA.

FLUID-PRESSURE BRAKE.

1,031,210.  Specification of Letters Patent.  Patented July 2, 1912.

Application filed November 22, 1904. Serial No. 233,875.

*To all whom it may concern:*

Be it known that I, WALTER V. TURNER, a citizen of the United States, residing in Wilkinsburg, in the county of Allegheny and State of Pennsylvania, have invented a certain new and useful Improvement in Fluid-Pressure Brakes, of which the following is a specification.

This invention relates to automatic fluid pressure brakes for railway cars, and has for its primary object to provide in addition to the usual automatic brake apparatus supplemental means for controlling the supply of fluid to the brake cylinder, and so connected up with the standard apparatus that the brakes may be controlled by either system.

The present standard automatic air brake equipment, as is well known, comprises a train pipe, auxiliary reservoir, brake cylinder, and a triple valve device operated by a reduction in train pipe pressure for opening communication for the supply of air from the auxiliary reservoir to the brake cylinder, and by an increase in train pipe pressure for opening communication from the train pipe to the auxiliary reservoir and from the brake cylinder to the atmosphere, the valve normally being in release position with the train pipe and auxiliary reservoir charged and the brake cylinder exhaust open. When a supplemental apparatus is employed for supplying air to the brake cylinder, it is necessary to provide some means for at the same time closing the exhaust from the brake cylinder through the triple valve device and various additional valve devices for this purpose have heretofore been proposed.

According to the present invention I propose to secure the closing of the exhaust through the triple valve without the use of an additional valve mechanism, and broadly considered this feature of my improvement comprises means for varying the pressure on one side of the triple valve piston, preferably by increasing the pressure on the auxiliary reservoir side of the triple valve piston so as to move the valve to close the brake cylinder exhaust at the time that the supplemental apparatus is operated to supply air to the brake cylinder.

Any means may be employed for admitting air under pressure to the triple valve piston for securing this result, but according to the preferred form air is admitted from the main reservoir, or other source of pressure, directly into the auxiliary reservoir or triple valve chamber, whereby the rise in auxiliary reservoir pressure above that of the train pipe causes the movement of the triple valve to close the brake cylinder exhaust and also to open the service port to the brake cylinder, whereupon the excess of air admitted to the auxiliary reservoir flows to the brake cylinder and the brakes may be applied to any desired degree. When this additional supply to the auxiliary reservoir is cut off the triple valve moves to lap in the usual way, thereby closing the admission port to the brake cylinder. By this means the brakes may be applied with the supplemental system without reducing or depleting the pressure of the train pipe or of the auxiliary reservoir below the standard degree.

When the brake is applied, it will be evident that the same could be released by then reducing the auxiliary reservoir pressure by means of a valve of the supplemental apparatus, thereby causing the movement of the triple valve to release position, but I prefer to employ a release valve connected directly to the brake cylinder whereby the pressure therein may be reduced in graduated amounts or released entirely at will, by the operation of the supplemental apparatus and without affecting the standard pressure of the auxiliary reservoir or train pipe.

While any desired form of supplemental brake apparatus may be employed for supplying air under pressure to the brake cylinder, I contemplate the use of an electro-pneumatic system having electrically operated valve mechanism with circuits and a switch within reach of the motorman or engineer for controlling the same, and it is with this form of apparatus that I have illustrated my invention in the accompanying drawing. This type of equipment is also particularly adapted to be applied to electrically propelled cars operating on the multiple unit plan, in which cars may be run either singly, or two or more motor cars, with or without trailer cars, may be coupled up in a train, the motors of all the motor cars being controlled from any one of the cars.

In the drawings: Figure 1 is a diagram showing an electro-pneumatic brake equipment constructed in accordance with my invention and applied to a train of two cars, one being indicated as a motor car and the other as a trailer car; and Fig. 2 a view showing the triple valve device with the application and the release magnet valves in section.

In service of this character, each motor car of a train is provided with a main reservoir 1, motor-driven air compressor 2, pump governor 3, main reservoir pipe 4, motorman's brake valve 5, usually one at each end of the car, having the usual feed valve 6, train pipe 7, triple valve 8, auxiliary reservoir 9, and brake cylinder 10, all of which may be the ordinary standard air brake apparatus, the construction and operation of which is well understood in the art.

The trailer cars are similarly equipped with the exception of the main reservoir, air pump and pump governor, and may be provided with brake valves and a main reservoir pipe adapted to be coupled up with the main reservoir pipe of the adjacent cars for the purpose of furnishing a source of air pressure upon these cars and for connecting up all main reservoirs of the motor cars in the train. In addition to this equipment I provide supplemental apparatus comprising an electric application valve 11 operated by electro-magnet 12 and controlling the supply of compressed air from the pipe 13 and the main reservoir, main reservoir pipe, or other source of pressure, to the pipe 14 leading to the auxiliary reservoir side of the triple valve piston. This connection is, shown as leading directly into the slide valve chamber of the triple valve device, but obviously may be made at any other part of the auxiliary reservoir if desired.

An electric release valve 15, operated by electro-magnet 18, and having exhaust port 16, is connected by a pipe 17 with the brake cylinder at any convenient point, that shown being the brake cylinder passage in the triple valve body or casing. The magnets 12 and 18 on each car are connected up with the respective circuit wires 19 and 20 running through the train, the current for operating the same being supplied from a battery 21, or other source of electricity. A switch having a movable arm 22 and contact points 23 and 24, may be used for controlling the respective circuits and the switch arm may be operated either separately or in connection with the handle 25 of the motorman's brake valve, as illustrated in the diagram.

On the motor cars the pipe 13 is preferably connected directly to the main reservoir, and a check valve 26 is located between the main reservoir and the main reservoir pipe line for the purpose of preventing back flow from the main reservoir pipe to the main reservoir when two or more motor cars are coupled up together in the train with their main reservoir pipes connected. By this means each air pump will supply its own reservoir and its share of the main reservoir line, but no pump will be required to raise the pressure in the other main reservoirs.

The triple valve device may be of the usual construction comprising the piston chamber 35, containing piston 27, valve chamber 28 open to the auxiliary reservoir and containing main slide valve 29, graduating valve 31 controlling service port 30, brake cylinder port or passage 32, main exhaust cavity 33 connecting the brake cylinder passage with the exhaust port 34 when the valve is in its normal release position.

The operation of my improved apparatus is as follows: The brake valve at the head end of the first car being set in running position the system is charged up in the usual way through the feed valve, the other brake valves being set in lap position, and all of the main reservoirs supplying air to the main reservoir pipe line and to the operating brake valve. An excess pressure should be, and usually is, carried in the main reservoir and main reservoir pipe line above that of the normal standard degree, as determined by the feed valve, to which the train pipe and auxiliary reservoirs are charged. If the switch is operated by the same handle as the brake valve, the arm 22 may be so positioned as to make contact with point 24 when the brake valve is in running position, and this will then also be the electric release position, since the circuit is then closed from the battery 21, or source of current, through wire 20, thereby energizing magnets 18 of the electric release valves 15 and holding the same open.

In order to apply the brakes electrically, the switch arm 22 is turned to electric application position, in which contact is made with point 23, thereby breaking the circuit to the release magnets 18, which permits the release valves 15 to close, and completing the circuit 19 to the application magnets 12, thereby causing the valves 11 to open communication from the main reservoir or main reservoir line to the auxiliary reservoir. Air from this source of higher pressure then flows to the auxiliary reservoir and raising the pressure therein and upon the triple valve piston above that of the train pipe, causes the triple valve piston and slide valve to move sufficiently to close the brake cylinder exhaust port and to open the service port to the brake cylinder, whereupon the air flows to the brake cylinder as fast as supplied from the main reservoir to the auxiliary reservoir. When the desired pressure has been admitted to the brake cylinder the switch is turned to break the circuit 19, thereby deënergizing the magnets 12 and allowing the application valves 11 to close, whereupon the triple valve piston with the graduating valve moves to lap position, closing the service port 30 as the auxiliary reservoir pressure falls to or slightly below that of the train pipe in the usual way. If desired, the brake cylinder pressure may be further increased by again turning the switch to application position and then back to lap. It will now be observed that the triple valve is in lap position with both the train pipe and auxiliary reservoir charged to the normal standard degree of pressure. To release the brakes electrically, the switch is turned to the first position again, making contact with point 24, energizing the magnets 18 and opening release valves 15, whereupon the air from the brake cylinder is released through exhaust port 16. If, instead of entirely releasing the brake, it is desired to reduce the brake cylinder pressure in graduated amounts, the switch may be turned to electric release position momentarily and then back to lap several times in succession, or as occasion requires, whereby the braking pressure may be graded down at will. And all the time that the brakes are being operated by the electric apparatus the train pipe and auxiliary reservoirs remain charged to substantially the normal maximum degree.

The brakes may be controlled pneumatically at any time by the usual movements of the motorman's brake valve for varying the train pipe pressure in the ordinary way, or automatically by a reduction in train pipe pressure, due to a break-in-two or a bursted hose, or other accident, as will be fully understood by all familiar with the art without further description.

If, after the brakes have been applied by means of the electric application valves, the current should fail, or for any other reason it should be found impossible to release the brakes electrically, the same may be readily released pneumatically by merely turning the brake valve to full release position, whereby pressure from the main reservoir or main reservoir line at a higher degree is turned into the train pipe and moves the triple valves on each car to release position, so that the air from the brake cylinder immediately discharges to the atmosphere through the exhaust port of the triple valve. It will also be evident that after the brakes have been applied pneumatically, the brake cylinder pressure may be graded down or fully released by means of the electric release valve, if desired.

By means of the addition of my improvement to the standard apparatus, it will now be apparent that a combined electric and automatic fluid pressure brake system is provided, whereby the brakes may be applied and released either electrically or pneumatically, or may be applied electrically and released pneumatically, or applied pneumatically and released electrically, thereby retaining all the advantageous features of the automatic system, and also securing additional advantages of greater flexibility and simultaneous action of the supplemental or electrically operated system.

Having now described my invention, what I claim as new and desire to secure by Letters Patent is:—

1. In a fluid pressure brake, the combination with a train pipe, auxiliary reservoir, brake cylinder, and a triple valve device comprising a piston and valve operated by variations in train pipe pressure for supplying air from the auxiliary reservoir to the brake cylinder, of a supplemental means for supplying air to the brake cylinder and for moving said triple piston and valve to close the brake cylinder exhaust.

2. In a fluid pressure brake, the combination with a train pipe, auxiliary reservoir, triple valve and brake cylinder, of supplemental means adapted to operate independently of the train pipe pressure for supplying air to the brake cylinder and for increasing the pressure on the auxiliary reservoir side of the triple valve piston.

3. In a fluid pressure brake, the combination with a train pipe, auxiliary reservoir, triple valve and brake cylinder, of supplemental means for supplying air to the brake cylinder and at the same time varying the pressure upon one side of the triple valve piston to cause the same to close the brake cylinder exhaust.

4. In a fluid pressure brake, the combination with a train pipe, auxiliary reservoir, triple valve and brake cylinder, of a source of fluid pressure and supplemental means having a valve normally subject to the pressure of said source for supplying air to the auxiliary reservoir and through the triple valve to the brake cylinder.

5. In a fluid pressure brake, the combination with a train pipe, auxiliary reservoir, triple valve and brake cylinder, of supplemental means normally subject to fluid pressure above the normal standard degree of train pipe pressure for increasing the auxiliary reservoir pressure above the normal standard degree of train pipe pressure and thereby supplying the brake cylinder.

6. In a fluid pressure brake, the combination with a train pipe, auxiliary reservoir, triple valve and brake cylinder, of supplemental means operating independently of the train pipe pressure for controlling the supply of air to the auxiliary reservoir and brake cylinder, and its release from the brake cylinder.

7. In a fluid pressure brake, the combination with a train pipe, auxiliary reservoir, triple valve and brake cylinder, of an electrically operated valve mechanism for supplying air to the brake cylinder and for varying the pressure upon one side of the triple valve piston to cause the same to close the brake cylinder exhaust.

8. In a fluid pressure brake, the combination with a train pipe, auxiliary reservoir, triple valve and brake cylinder, of an electrically actuated valve mechanism for supplying air from a source of higher pressure to the auxiliary reservoir and through the triple valve to the brake cylinder.

9. In a fluid pressure brake, the combination with a train pipe, auxiliary reservoir, triple valve and brake cylinder, of an electrically actuated valve mechanism for supplying air from a source of higher pressure to the auxiliary reservoir and through the triple valve to the brake cylinder, and for releasing the air from the brake cylinder.

10. In a fluid pressure brake, the combination with a train pipe, auxiliary reservoir, triple valve and brake cylinder, of an electrically actuated application valve for supplying air from a source of higher pressure to the auxiliary reservoir, and an electrically actuated release valve for controlling the exhaust from the brake cylinder.

11. In a fluid pressure brake, the combination with a main reservoir, brake valve, train pipe, auxiliary reservoir, triple valve and brake cylinder, of supplemental means for controlling communication from the main reservoir to the auxiliary reservoir and from the brake cylinder to the exhaust, independent of the triple valve.

12. In a fluid pressure brake, the combination with a main reservoir, brake valve, train pipe, auxiliary reservoir, triple valve and brake cylinder, of an electrically actuated application valve for controlling communication from the main reservoir to the auxiliary reservoir, and an electrically actuated release valve for controlling the exhaust from the brake cylinder, independent of the triple valve.

13. In a fluid pressure brake, the combination with a main reservoir, brake valve, train pipe, auxiliary reservoir, triple valve and brake cylinder, of a main reservoir pipe line normally charged with fluid at main reservoir pressure, and supplemental valve mechanism for controlling communication from the main reservoir to the auxiliary reservoir.

14. In a fluid pressure brake, the combination with a main reservoir, brake valve, train pipe, auxiliary reservoir, triple valve and brake cylinder, of a main reservoir pipe line, and an electrically actuated valve for controlling communication from the main reservoir to the auxiliary reservoir.

15. In a fluid pressure brake, the combination with a main reservoir, brake valve, train pipe, auxiliary reservoir and brake cylinder, of a main reservoir pipe line, a non-return check valve located between the main reservoir and the main reservoir pipe line, and a supplemental valve mechanism for controlling communication from the main reservoir to the auxiliary reservoir.

16. In a fluid pressure brake, the combination with a train pipe, triple valve, auxiliary reservoir, and brake cylinder, of a source of fluid pressure, an application valve for supplying air from said source of fluid pressure to the brake cylinder, and an electric release valve for releasing air from the brake cylinder.

17. In a fluid pressure brake, the combination with a train pipe and triple valve comprising a valve and piston, of an electrically controlled valve for increasing the pressure on one side of said piston to thereby supply air to the brake cylinder.

In testimony whereof I have hereunto set my hand.

WALTER V. TURNER.

Witnesses:
R. F. EMERY,
JAMES B. MACDONALD.